3,257,329
EMULSIFIABLE DERIVATIVES OF
NATURAL WAXES
Kalmen Motiuk, Edison Township, and Lester I. Conrad, Highland Park, N.J., assignors to American Cholesterol Products, Inc., Edison, N.J., a corporation of New York
No Drawing. Filed Nov. 13, 1961, Ser. No. 152,063
11 Claims. (Cl. 252—316)

The present invention relates to novel chemical derivatives of waxes of natural origin. These derivatives contain wax-like substances formed by the replacement of acyl groups of the waxes of natural origin with acyl groups of a free fatty acid, and possess new and useful properties not found in the original natural waxes.

A particularly desirable feature of these novel derivatives is that they are more readily emulsified than the original natural waxes. The derivatives exhibit a substantial acid number relative to the waxes of natural origin. This characteristic of the derivatives makes it possible to neutralize the derivatives with greater amounts of inorganic or organic bases. Both the derivatives and the neutralized products find utility as additives in oils and oil-wax mixtures imparting valuable properties to these compositions.

The waxes which are used as starting materials in the invention are natural plant, animal and mineral waxes made up of non-glyceryl esters formed in nature by the union of higher alcohols with higher fatty acids (see page 2 of "Chemistry and Technology of Waxes" by Warth, 1956). By subjecting these ester waxes to chemical reactions which are explained below, new products are obtained which are radically different from the original waxes and which can serve either as raw materials or as intermediates in the manufacture of new and varied industrial products. While a wide variety of natural waxes may be used as starting materials, we have found the more practical choice to be one of the group consisting of wool wax, beeswax and carnauba wax.

Chemical reactions of the nature of the reaction employed in the process for producing the derivatives are known, in general, as "acidolysis." Acidolysis has been defined as a reaction during which an acyl group of an ester is replaced by an acyl group of a free fatty acid (see page 311 of "Fatty Acids," by Markley, 1947).

The present acidolysis reaction can be generally represented by the following formula:

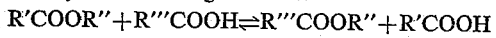

R'COOR″+R‴COOH⇌R‴COOR″+R'COOH in which R′, R″ and R‴ represent alkyl and/or aryl groups of different molecular weight; R'COOR″ represents the wax of natural origin; R‴COOH represents a free fatty acid which will supply a new acyl group in the wax; R‴COOR″ represents a wax-like substance in which the acyl group R'CO has been replaced by the acyl group R‴CO; and R'COOH is a free acid formed from the acyl group R'CO which has been displaced from the original natural wax, R'COOR″. A sufficient amount of the fatty acid is supplied in the reaction to provide a substantial excess over the amount that would be theoretically required to allow conversion of substantially the whole of the original natural wax to a wax-like substance having new acyl groups substituted for the acyl groups of the natural wax. Acidolysis is, however, an equilibrium reaction and the crude reaction product will be a mixture of the four products represented in the above formula.

A wide variety of fatty acids having acyl groups different from the acyl groups of the original natural wax may be employed in the above acidolysis reaction. However, it is preferable to utilize an acid having acyl groups of lower molecular weight than those of the natural wax. In the case where R‴COOH is a low molecular weight acid, the crude reaction product can be easily freed of the unreacted acid by washing or by distillation. The resulting refined product will consist of some unreacted natural wax, a wax-like substance in which acyl groups of the original natural wax have been replaced by acyl groups of the fatty acid, and displaced acids formed from the acyl groups displaced from the original natural wax. This refined product will be referred to as "acidolized wax."

An acidolized wax possesses new and valuable properties not found in the original natural wax and may be characterized as an acid enriched wax ester in which the acids found in the natural wax in ester form are now displaced and in a free state. An important property of such an acidolized wax is that it is more emulsifiable than the wax of natural origin from which it is derived. Acidolized waxes of the invention exhibit a substantial acid number as compared to natural waxes, the acid number being increased by as much as 10 to 60 units over the acid number of the original natural ester wax. Such an increase in value of the acid number is significant in that it allows the acidolized wax product to be utilized in the manufacture of products where the original natural wax would be either less suitable or totally unsuitable. Acidolized waxes have a greater ability to wet pigments incorporated in wax compositions. They are more plastic than the waxes of natural origin.

Acidolysis of natural waxes in accordance with the invention is carried out by heating a mixture of the natural wax and a low molecular weight aliphatic acid in the presence of a catalyst. A wide variety of aliphatic acids can be employed in the acidolysis of natural waxes. Both monocarboxylic and dicarboxylic aliphatic acids may be used in the reaction, an example utilizing diglycolic acid being given hereinafter as an illustration of the latter. Halogenated aliphatic acids, such as chloracetic acid, may be utilized as well. The acidolized wax can be expected to display specific properies that are induced by the particular acid employed in the acidolysis reaction as well as exhibit the general properties of an acidolized wax product hereinbefore described; hence, the choice of acid may be largely governed by the properties desired in the acidolized wax product. We have found the more practical choice, from the standpoint of economy, ease of reaction and general properties, to be one of the group of monocarboxylic aliphatic acids consisting of acetic acid, formic acid and propionic acid. Any of the common esterification catalysts such as, for example, para-toluene sulfonic acid, sulfuric acid or hydrochloric acid may serve as an acidolysis catalyst. The mixture is heated for a period of about two to four hours at a temperature of about 115° C. to about 170° C., generally at atmospheric pressure. Closed vessels can be utilized where it may be desirable to reduce or increase the pressure. An inert atmosphere may be employed where necessary. The crude reaction product is washed several times in an appropriate solvent in order to remove the excess, unreacted acid. The washed product may be further refined by bleaching and steam deodorization.

The following examples are illustrative of the preparation of novel chemical derivatives of natural waxes falling within the scope of the invention. It will be understood that these examples are given by way of illustration only and are not intended to restrict the invention.

*Example 1*

300 gms. of wool wax (acid number: 1.3) were dried by heating to 125° C. at 5 mm. pressure. The dried wool wax was mixed with 69 gms. of glacial acetic acid and 1.5 gms. of para-toluene sulfonic acid. The mixture was placed in three pressure bottles. The bottles were kept open while heating the reaction mixture to 100° C. At this point the bottles were closed and heated at 143–168° C. for 2¼ hours. The bottles were allowed to cool to about 100° C. and opened. The crude reaction product was transferred to a separatory funnel and washed several times with hot water in order to remove the unreacted acetic acid and the catalyst. The wet reaction product was dried by heating to 110° C. at 20 mm. pressure. The dry reaction product was a wax-like material having an acid number of 46.0.

*Example 2*

312 gms. of dried wool wax (acid number: 0.8) were mixed with 60 gms. of glacial acetic acid and 1.5 gms. of para-toluene sulfonic acid. The above mixture was heated to reflux (about 120° C.) while agitating and kept at reflux for 3 hours. The crude reaction product was transferred to a separatory funnel and washed several times with hot water to remove the unreacted acetic acid and the catalyst. The wet reaction product was dried by heating to 100° C. under 2 mm. pressure. At this point the reaction product was deodorized by passing 30 gms. of water through it for a period of 20 minutes while maintaining the temperature at 95–105° C. at about 2 mm. pressure. The product was dried at 105° C. and 2 mm. pressure while passing nitrogen. The dry product was then bleached twice with about 3 gms. of hydrogen peroxide (35%) each time. The bleaching was carried out each time at 95–100° C. for 20 minutes. The deodorized and bleached product was then dried by heating at 105° C. under 2 mm. pressure. The dry deodorized and bleached acidolized wool wax had an acid number of 27.7.

*Example 3*

117 gms. of beeswax (acid number: 20.1) were melted and mixed with 18 gms. of glacial acetic acid and 0.6 gms. of para-toluene sulfonic acid. This mixture was heated at 120–125° C. (reflux temperature) for 3 hours. The crude reaction product was transferred to a separatory funnel and washed six times with 300 ml. of hot water each time. The washed oily layer was dried by heating to 110° C. under 10 mm. of pressure. This product was steam deodorized by passing 5 ml. of water at 95–100° C. The product was dried by heating to 110° C., top vacuum, and bleached while using 2 ml. hydrogen peroxide (35%). The bleaching was carried out for 20 minutes at 95–100° C. This product was dried and again steam deodorized. The acidolized beeswax had an acid number of 52. It was somewhat softer and more plastic than the original beeswax.

*Example 4*

360 gms. of carnauba wax (acid number: 9.3) were melted and mixed with 60 gms. of acetic acid and 1.8 gms. of para-toluene sulfonic acid. The mixture was heated to reflux (118–124° C.) and kept there for 3 hours. The crude reaction product was then transferred to a separatory funnel, washed several times with hot water, and dried by heating to 100° C. at 50 mm. pressure. The dry product was bleached twice with 3.6 gms. of hydrogen peroxide (35%) at 90–95° C. for 20 minutes each time. The product was dried and steam deodorized at 100–130° C. for 15 minutes. It was then filtered hot with a pre-coated filter. The acidolized carnauba wax had an acid number of 38.

*Example 5*

500 gms. of dried wool wax (acid number: 0.8) were heated to 80° C. and mixed with 76.5 gms. of formic acid and 2.5 gms. of para-toluene sulfonic acid. The mixture was heated to reflux while agitating and kept at reflux (116–118° C.) for 3 hours. The crude reaction product was transferred to a separatory funnel and washed several times with hot water in order to remove the unreacted formic acid and the catalyst. The wet reaction product was dried by heating to 105° C. under 2 mm. pressure while passing nitrogen. At this point, the reaction product was deodorized by passing 25 gms. of water through it while maintaining the temperature at 105–110° C. at about 2 mm. pressure. The product was dried by heating to 110° C. and about 2 mm. pressure while passing nitrogen. The dry deodorized acidolized wool wax had an acid number of 14.0.

*Example 6*

500 gms. of wool wax (acid number: 0.97) were melted and mixed with 118 gms. of propionic acid (99%) and 2.5 gms. of para-toluene sulfonic acid. The reaction mixture was heated to reflux and kept at reflux (128–130° C.) for 3 hours. The crude reaction product was transferred to a separatory funnel, washed several times with hot water and dried by heating to 110° C., top vacuum. The product was then deodorized by passing 50 ml. of water at 105–110° C., top vacuum. The dry product had an acid number of 33.

*Example 7*

344 gms. of beeswax (acid number: 17.4) were melted and mixed with 66 gms. of propionic acid and 1.7 gms. of para-toluene sulfonic acid. The reaction mixture was refluxed for 3½ hours at 135–143° C. The crude reaction product was then transferred to a separatory funnel, washed several times with hot water and dried by heating to 105° C. at 40 mm. pressure. The product was steam deodorized by passing 10 ml. of water at 100–110° C. and 40 mm. pressure. The steam deodorized material had an acid number of 52.

*Example 8*

321 gms. of dry wool wax (acid number: 0.97) were melted and mixed with 67.5 gms. of diglycolic acid and 1.5 gms. of para-toluene sulfonic acid. The mixture was stirred and heated at 135–145° C. for 3 hours at atmospheric pressure. The reaction mixture was transferred to a separatory funnel and washed several times with hot water in order to remove the unreacted diglycolic acid and the catalyst. The wet product was dried by heating to 105° C., 10 mm. pressure, and subsequently steam deodorized by passing 10 ml. of water at 95–105° C. and 10 mm. pressure. The product was finally dried by heating to 105° C., 10 mm. pressure. The dry reaction product had an acid number of 24.0.

*Example 9*

321 gms. of dry wool wax (acid number: 0.97) were melted and mixed with 94 gms. of monochloracetic acid and 1.5 gms. of para-toluene sulfonic acid. The mixture was stirred and heated to 123–132° C. for 3 hours at atmospheric pressure. The reaction mixture was transferred to a separatory funnel and washed several times with hot water in order to remove the unreacted monochloracetic acid and the catalyst. The wet product was dried by heating to 105° C., 20 mm. pressure, and subsequently steam deodorized by passing 30 ml. of water at 90–105° C., 15 mm. pressure. The product was finally dried by heating to 105° C., 15 mm. pressure. The dry reaction had an acid number of 41.0.

The refined product of each of the above examples is a more plastic, more readily emulsified, acid enriched wax product which can be employed in applications where the original natural wax could not readily be utilized. For example, the acidolized wax product can be employed as a dispersing and bodying agent in formulating specialty products in pharmaceuticals, cosmetics, polishes, coatings, textiles, adhesives, lubricants, paints and inks.

An important feature of acidolized wax products is their substantial acid number in comparison to the waxes of natural origin from which the acidolized products are derived. The relatively high acid number makes it possible to neutralize the derivatives with greater amounts of a variety of inorganic or organic bases. Such a neutralization converts the acidic constituents of the acidolized wax product into soaps resulting in a neutralized product that will readily form clear solutions, emulsions or dispersions in various oils and oil-wax mixtures. For the purposes of further discussion, the neutralized products of acidolized waxes will be referred to as "soaps."

Of particular interest are the sodium, potassium, lithium, calcium and aluminum soaps. When utilized as additives in oils and oil-wax mixtures, these soaps will impart new and valuable properties to such compositions making them useful in cosmetics, pharmaceuticals and various other products. For example, the employment of such soaps as additives in oils will affect the viscosity of the oils and provide a means for controlling this property of oils under various operating conditions. Not only will some of these soaps act as thickening agents, in general, but some have been found to form both clear and opaque gels in oils in certain concentrations. For example, the soaps of the acidolized waxes formed by acidolysis of either wool wax or beeswax with acetic acid will form gels in mineral oil. This characteristic of these particular acidolized products is significant in that it gives rise to particular commercial applications for these products over and above the general applications of acidolized wax products.

The following examples are illustrative of the preparation of such soaps and mineral oil solutions:

*Example 10*

56 gms. of melted acidolized wool wax prepared as in Example 2 were neutralized with 24.8 cc. of methanolic sodium hydroxide (1 N) and refluxed. The methanol was distilled up to a pot temperature of 115° C. and 10 mm. pressure. 84 gms. of mineral oil (viscosity 70 Saybolt) were added and agitated while heating to 115° C., top vacuum. This operation served to remove any residual methanol. On cooling, the mineral oil solution (containing 40% solids) set to a transparent, hard gel. The 20% solution and 10% solution formed firm, clear gels while the 5% solution formed a soft, clear gel. The same results were obtained utilizing mineral oil with a viscosity of 350 Saybolt.

*Example 11*

30 gms. of melted acidolized wool wax prepared as in Example 2 were neutralized with 12.75 cc. of methanolic potassium hydroxide (1 N) and heated to 80° C. while removing methanol by distillation. The drying of the neutralized product was completed by adding 45 gms. of mineral oil (viscosity 70 Saybolt) and heating to 90° C., top vacuum. On cooling, the mineral oil solution of the neutralized acidolized wool wax became a clear, stiff gel. This gel contained 40% solids. A 20% solution in mineral oil also formed a clear, stiff gel, while the 10% solution formed a clear, soft gel. The 5% solution formed a clear, viscous fluid. The same results were obtained utilizing mineral oil with a viscosity of 350 Saybolt.

*Example 12*

160 gms. of beeswax acidolized with acetic acid (acid number: 47.0) were melted and agitated in a resin kettle. At 65° C., 123.5 cc. of methanolic potassium hydroxide (1.03 N) were added and the mixture brought to reflux. The methanol was removed by distillation at reduced pressure. The resulting potassium soap of acidolized beeswax dissolved clearly in hot mineral oil. The 20%, 10% and 5% solutions of the soap in mineral oil acquired the consistency of a firm gel at room temperature.

*Example 13*

310 gms. of wool wax acidolized with acetic acid (acid number: 33.6) were melted and agitated in a resin kettle. At 50° C., 171 cc. of methanolic lithium hydroxide (1.03 N) were added and the mixture brought to reflux while agitating. The methanol was removed by distillation to 120° C., 2 mm. pressure. The mineral oil solutions of the above soap had the consistency of a gel and were practically transparent.

*Example 14*

500 gms. of wool wax acidolized with acetic acid (acid number: 33.6) were melted in a resin kettle. At 50° C., 227 cc. of methanolic potassium hydroxide (1.02 N) were added and the mixture brought to reflux while agitating. 368 cc. of an aqueous solution of calcium chloride (0.775 N) were added, dropwise, and kept at reflux for 15 minutes. Hot water and benzol were added and allowed to separate. The benzol layer was washed several times with hot water in order to remove potassium chloride and unreacted calcium chloride. The benzol was removed from the benzol layer by distillation to 110° C. at 15 mm. pressure while agitating and passing nitrogen. At this point, the material was steam deodorized by passing 1 cc. of water at 110° C. at 15 mm. pressure. The 40% and 20% solutions of the above soap in mineral oil had the consistency of a gel.

Although the present invention has been described with reference to the specific details of certain embodiments thereof, it is not intended that such details shall be regarded as limitations upon the scope of the invention as defined in the appended claims.

We claim:

1. An acidolized wax consisting essentially of an ester wax of natural origin, a wax-like substance in which acyl groups of said ester wax have been replaced by acyl groups of an aliphatic acid, said acyl groups of said aliphatic acid being different from and having a lower molecular weight than said acyl groups of said ester wax, and free acids formed from acyl groups of said ester wax which have been displaced from said ester wax of natural origin, said product being characterized by exhibiting an acid number substantially higher than the acid number of said ester wax of natural origin as a result of said free acids.

2. The acidolized wax of claim 1 wherein said ester wax of natural origin is selected from the group consisting of wool wax, beeswax and carnauba wax.

3. The acidolized wax of claim 2 wherein said aliphatic acid is selected from the group consisting of acetic acid, formic acid and propionic acid.

4. The acidolized wax of claim 3 wherein said product exhibits an acid number of from 10 to 60 units greater than the acid number of said ester wax of natural origin.

5. The acidolized wax of claim 2 wherein acid product exhibits an acid number of from 10 to 60 units greater than the acid number of said ester wax of natural origin.

6. The acidolized wax of claim 1 wherein said aliphatic acid is selected from the group consisting of acetic acid, formic acid and propionic acid.

7. The acidolized wax of claim 6 wherein said product exhibits an acid number of from 10 to 60 units greater than the acid number of acid ester wax of natural origin.

8. A new composition of matter especially suitable as an additive in oils and oil-wax mixtures for imparting desirable properties thereto consisting essentially of an ester wax of natural origin, a wax-like substance in which acyl groups of said ester wax have been replaced by acyl groups of an aliphatic acid, said acyl groups of said aliphatic acid being different from and having a lower molecular weight than said acyl groups of said ester wax, and soaps of free acids formed from acyl groups of said ester wax which have been displaced from said ester wax of natural origin, said composition being characterized by its ability to be incorporated readily in said oils and oil-wax mixtures without additional treatment.

9. The composition of claim 8 wherein said ester wax of natural origin is selected from the group consisting of wool wax, beeswax and carnauba wax and said aliphatic acid in selected from the group consisting of acetic acid, formic acid and propionic acid.

10. The composition of claim 8 wherein said ester wax of natural origin is wool wax and said aliphatic acid is acetic acid, said composition being further characterized by its ability to readily form a gel in mineral oil.

11. The composition of claim 8 wherein said ester wax of natural origin is beeswax and said aliphatic acid is acetic acid, said composition being further characterized by its ability to readily form a gel in mineral oil.

References Cited by the Examiner
UNITED STATES PATENTS
1,558,299   10/1925   Schwartz _____ 260—410.8

OTHER REFERENCES

"Fatty Acids," by Markley, Interscience Pub. Inc., 1947, New York, page 311.

JULIUS GREENWALD, *Primary Examiner.*

I. VAUGHN, R. D. LOVERING, *Assistant Examiners.*